G. BROCKE.
VALVE.
APPLICATION FILED DEC. 13, 1907.
916,262.
Patented Mar. 23, 1909.
2 SHEETS—SHEET 1.
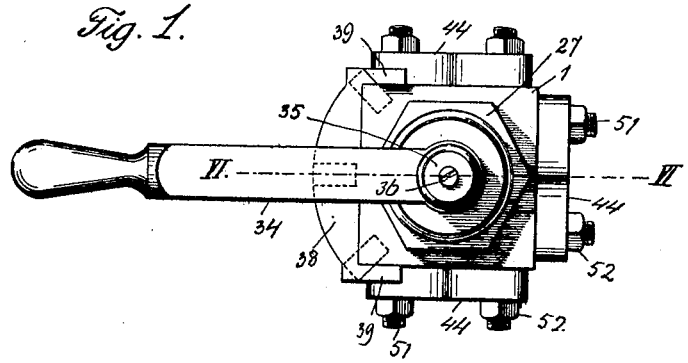
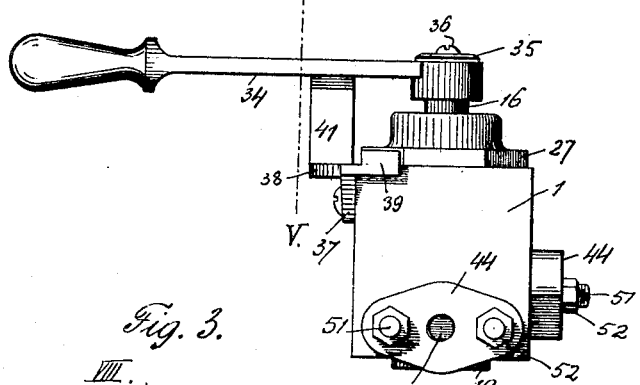
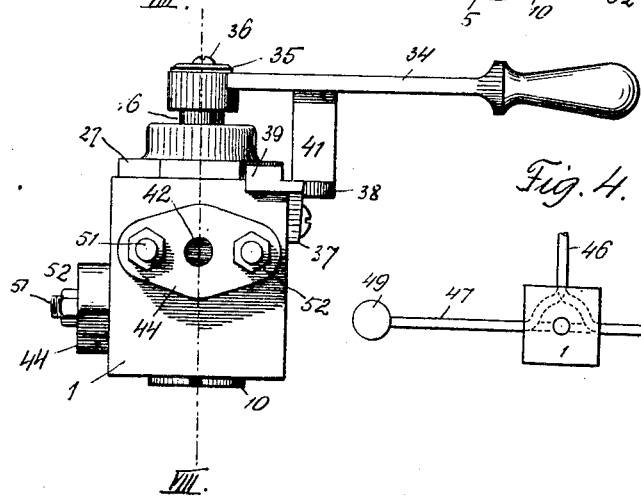
Inventor
Gerhard BROCKE
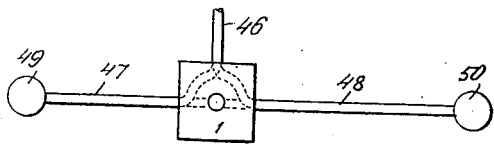

G. BROCKE.
VALVE.
APPLICATION FILED DEC. 13, 1907.

916,262.

Patented Mar. 23, 1909.
2 SHEETS—SHEET 2.

UNITED STATES PATENT OFFICE.

GERHARD BROCKE, OF ALLEGHENY, PENNSYLVANIA.

VALVE.

No. 916,262.     Specification of Letters Patent.     Patented March 23, 1909.

Application filed December 13, 1907. Serial No. 406,323.

*To all whom it may concern:*

Be it known that I, GERHARD BROCKE, a citizen of the United States of America, residing at Allegheny, in the county of Allegheny and State of Pennsylvania, have invented certain new and useful Improvements in Valves, of which the following is a specification, reference being had therein to the accompanying drawing.

This invention relates to a hydraulic valve, and the primary object of this invention is, to provide a novel triple or three-way valve, wherein positive and reliable means are employed for insuring a perfect cut off of water, steam or air, when the valve is in one position, and a clear passage for steam or air when the valve is turned to its other positions.

Another object of this invention is to provide an equally balanced valve, wherein novel means is employed for holding the valve stem in position, thus preventing the pressure within the valve from elevating and displacing the valve stem or plug.

A further object of this invention is to provide a hydraulic valve adapted to be used in connection with two cylinders, the valve maintaining the pressure in one cylinder and allowing the other cylinder to exhaust.

A still further object of this invention is to provide a strong and durable hydraulic valve which will be compact, inexpensive to manufacture, and easily operated.

With the above and other objects in view, which will more readily appear as the invention is better understood, the same consists in the novel construction, combination and arrangement of parts to be hereinafter more fully described, and then specifically pointed out in the appended claims.

In the drawings, Figure 1 is a plan of a hydraulic valve in accordance with this invention illustrating the same in a closed position, Fig. 2 is an elevation of one side of the same, Fig. 3 is a similar view illustrating the opposite side or the inlet port side of the valve, Fig. 4 is a diagrammatic view of the valve as used in connection with two cylinders, Fig. 5 is a rear elevation of the valve, Fig. 6 is a front elevation of the valve illustrating the handle thereof in section upon the line V—V of Fig. 2, Fig. 7 is a vertical longitudinal sectional view taken on the line VI—VI of Fig. 1. Fig. 8 is a bottom plan of the valve stem, Fig. 9 is a transverse sectional view taken on the line VIII—VIII of Fig. 3, Fig. 10 is a horizontal sectional view taken on the line IX—IX of Fig. 6, illustrating the valve in an open position, Fig. 11 is a similar view illustrating the valve in a closed position, Fig. 12 is a similar view illustrating the valve in another open position, Fig. 13 is a vertical sectional view of the valve, taken on the line XII—XII of Fig. 12, and, Fig. 14 is a transverse sectional view taken on the line XIII—XIII of Fig. 12.

Referring to the drawings in detail, 1 denotes a valve casing which is formed with a vertical bore for the reception of a valve plug and valve head to be hereinafter referred to. The wall of the bore is stepped whereby the shoulders $5^a$, 6, and 7 are provided. The wall of the bore is furthermore formed with a pair of superposed annular recesses 2, 3, which communicate respectively with the lateral ports 4 and 5, these ports serving alternately as inlet and outlet ports. Arranged within the lower portion of the bore and supported upon the shoulders hereinbefore referred to is a stepped valve plug 8, the upper portion of said plug 8 resting upon the shoulder $5^a$ while the lower portion projects from the bottom of the casing 1 and is threaded as at 9 for the reception of a nut 10. The valve plug is stationary and is retained from movement through the medium of a set screw 11 maintained in position by the nut 10 as clearly shown in Fig. 7.

The valve plug 8 is formed with a centrally disposed vertical passage 12 having its wall at its lower end provided with threads 13 to which can be connected the end of an exhaust pipe (not shown). The valve plug 8 is furthermore provided with a pair of vertically disposed channels 15 which extend from the top of the plug and open into the annular recess 3. Vertical channels 14 are also formed in the plug 8 and which are oppositely disposed with respect to the channels 15 and the said channels 14 extend from the top of the plug 8 and open into the annular recess 2.

Mounted in the upper portion of the bore of the casing 1, and seated upon the top of the valve plug 8 is a valve head 17 having formed integral therewith a vertically extending stem 16 which is of a length as to project beyond the top of the casing 1. The valve head 17 is formed with a depending collar 18 adapted to engage a retaining ring 19 supported by the valve plug 8. The ring 19 centers the valve head within the valve casing 1. The lower face of the valve head 17 is provided with a channel 20 and the said head 17 is furthermore provided with a pair of L-shaped ports 21 which are adapted to alternately communicate with the channels 14 and 15 of the valve plug 8.

Surrounding the valve head 17 and seated upon an annular shoulder 22 formed on the wall of the bore of the casing 1, are annular bearing members 23 and 24. The member 23 is substantially T-shaped in cross section and the member 24 channel-shaped, the latter member being inverted upon the member 23. The member 23 is formed with a plurality of openings 25 for admitting fluid between said members.

Detachably connected to the upper end of the valve casing 1 as at 26 is a cap 27 provided with a shoulder 28 to constitute a guide for the upper edges of the valve head 17. The cap 27 is recessed as at 29 and arranged within said recess 29 is a coil spring 30 which at one end engages in an annular groove 32 formed in the cap 27 and at its other end engages in an annular groove 31 formed in the valve head 17. The stem 16 projects through the cap 27 and said projecting end is squared as at 33 and mounted upon the said squared end 33 is an operating lever 34 which is retained upon the shank through the medium of a washer 35 and screw 38, the latter extending through the washer and engaging in the squared end of the stem.

One side of the valve casing 1 carries a bracket 37 having a bearing shelf 38 provided at each end with a stop 39, each of which is beveled as at 40. The lever 34 carries a depending lug 41 which is adapted to ride upon the shelf 38 and have its movement arrested by the stops 39 whereby the movement in either direction of the operating lever 34 will be limited. The bore of the valve casing 1 is furthermore provided with an annular recess 43 which constitutes a chamber and surrounds the lower portion of the valve head 17 and communicating with the said chamber 43 is a laterally extending port 42 which constitutes an inlet.

In order that pipes can be easily connected to the valve casing 1 so as to communicate with the ports 4, 5, and 42, plates 44 having threaded openings 45 are secured to the sides of the valve casing 1 by the bolts 51 and the nuts 52. The threaded openings 45 of the plates 44 are adapted to register with the ports 4, 5, and 42 and are further adapted to receive the threaded ends of the pipes 46, 47 and 48. The pipes 47 and 48 communicate with the cylinders 49 and 50 respectively, while the pipe 46 communicates with a suitable source of water, steam or air supply under pressure. The channel 12 of the valve plug 8 may communicate with any suitable receptacle to receive the exhaust from the cylinders 49 and 50.

In Fig. 4 of the drawings is illustrated diagrammatically the interposition of a hydraulic valve in accordance with this invention between the two hydraulic cylinders 49 and 50, and in describing the operation, reference will be had not only to Fig. 4 but also to Figs. 7, 8, 13 and 14.

Assuming that the lever 34 and the lug 41 are in the position indicated by dotted lines, Fig. 10, the valve 17 will be shifted so as to establish communication between the pipe 46 and the pipe 47, the latter opening into the cylinder 49. More specifically, it will be stated that when the lever 34 is in the position as shown in Fig. 10, water under pressure enters port 42 from pipe 46, passes around the chamber 43, enters ports 21 of the valve head 17, the ports 21 at this position of the valve communicating with the channels 15, the water under such conditions passing down channels 15 and is supplied to the annular recess 3, passes out from said recess 3, through port 5 into pipe 47 where it is conducted to the cylinder 49. When the valve is shifted to the position shown in Fig. 10, communication is established between the pipe 48 and the channels 12 so that an exhaust can be had from the cylinder 50. In this connection, it will be stated that water exhausting from the pipe 48 enters port 4, annular recess 2, travels up the channels 14, passes through the channel 20 and is exhausted through the channel 12 of the valve plug 8. To supply pressure to the cylinder 50 and exhaust the same from cylinder 49, the operating lever is shifted to the position indicated in Fig. 12. In this connection it will be stated that water entering port 42 and chamber 43 passes therefrom into the ports 21, then through channels 14 to the annular recess 2 through port 4 into pipe 48 where it is conducted to the cylinder 50. The exhaust from the cylinder 49 is had through port 5, annular recess 3, channels 15, channels 20 and 12.

From the foregoing, it is evident that the laterally extending ports 4 and 5 alternately serve as exhaust and inlet ports and in order to shut off the supply of water, steam or air, the operating lever is shifted to the position indicated by dotted lines in Fig. 11 of the drawings, such position of the valve stem placing the channel 20 and ports 21 out of communication with the channels 14, 15 of the valve plug 8.

When the water, steam or air enters the chamber 43 of the valve casing, a quantity thereof will pass through the member 23 and serve to balance the valve stem 16. The coil spring 30 which surrounds the stem 16 is adapted to hold the valve head 17 in close contact with the top of the valve plug 8.

What I claim is:

1. A hydraulic valve comprising a valve casing having a bore with the wall thereof shouldered and formed with a plurality of superposed annular recesses, said casing further having lateral ports communicating with said recess, a chamber, and a lateral port communicating with said chamber, a stationary valve plug supported by the shoulders of the wall of the bore, said plug having a vertically disposed set of channels communicating with the lower of said recesses, and a vertically disposed set of channels communicating with the upper of said recesses, said plug furthermore provided with an exhaust channel, a shiftable valve head arranged within said casing, mounted upon said plug and surrounded by said chamber and provided with oppositely disposed ports adapted to communicate with a set of channels for establishing communication between said chamber and one of said recesses, said head furthermore provided on its lower face with a groove adapted to communicate with the other set of channels for establishing communication between the other recess and the exhaust channel of the plug.

2. A hydraulic valve comprising a valve casing having a bore with the wall thereof shouldered and formed with a plurality of superposed annular recesses, said casing further having lateral ports communicating with said recess, a chamber, and a lateral port communicating with said chamber, a stationary valve plug supported by the shoulders of the wall of the bore, said plug having a vertically disposed set of channels communicating with the lower of said recesses, and a vertically disposed set of channels communicating with the upper of said recesses, said plug furthermore provided with an exhaust channel, a shiftable valve head arranged within said casing, mounted upon said plug and surrounded by said chamber and provided with oppositely disposed ports adapted to communicate with a set of channels for establishing communication between said chamber and one of said recesses, said head furthermore provided on its lower face with a groove adapted to communicate with the other set of channels for establishing communication between the other recess and the exhaust channel of the plug, said plug projecting from said casing, retaining means to prevent movement of the plug, and means carried by the plug for maintaining said retaining means in position.

3. A hydraulic valve comprising a valve casing having a bore with the wall thereof shouldered and formed with a plurality of superposed annular recesses, said casing further having lateral ports communicating with said recess, a chamber, and a lateral port communicating with said chamber, a stationary valve plug supported by the shoulders of the wall of the bore, said plug having a vertically disposed set of channels communicating with the lower of said recesses, and a vertically disposed set of channels communicating with the upper of said recesses, said plug furthermore provided with an exhaust channel, a shiftable valve head arranged within said casing, mounted upon said plug and surrounded by said chamber and provided with oppositely disposed ports adapted to communicate with a set of channels for establishing communication between said chamber and one of said recesses, said head furthermore provided on its lower face with a groove adapted to communicate with the other set of channels for establishing communication between the other recess and the exhaust channel of the plug, a spring-pressed valve stem formed integral with said head, means connected with the casing for maintaining the valve stem in position, and an operating lever connected to the valve stem.

4. A hydraulic valve comprising a valve casing having a bore with the wall thereof shouldered and formed with a plurality of superposed annular recesses, said casing further having lateral ports communicating with said recess, a chamber, and a lateral port communicating with said chamber, a stationary valve plug supported by the shoulders of the wall of the bore, said plug having a vertically disposed set of channels communicating with the lower of said recesses, and a vertically disposed set of channels communicating with the upper of said recesses, said plug furthermore provided with an exhaust channel, a shiftable valve head arranged within said casing, mounted upon said plug and surrounded by said chamber and provided with oppositely disposed ports adapted to communicate with a set of channels for establishing communication between said chamber and one of said recesses, said head furthermore provided on its lower face with a groove adapted to communicate with the other set of channels for establishing communication between the other recess and the exhaust channel of the plug, said plug projecting from said casing, retaining means to prevent movement of the plug, means carried by the plug for maintaining said retaining means in position, a spring pressed valve stem formed integral with said valve head, and an operating lever connected to the valve stem.

5. A hydraulic valve comprising a valve casing having a bore with the wall thereof shouldered and formed with a plurality of superposed annular recesses, said casing further having lateral ports communicating with said recess, a chamber, and a lateral port communicating with said chamber, a stationary valve plug supported by the shoulders of the wall of the bore, said plug having a vertically disposed set of channels communicating with the lower of said recesses, and a vertically disposed set of channels communicating with the upper of said recesses, said plug furthermore provided with an exhaust channel, a shiftable valve head arranged within said casing, mounted upon said plug and surrounded by said chamber and provided with oppositely disposed ports adapted to communicate with a set of channels for establishing communication between said chamber and one of said recesses, said head furthermore provided on its lower face with a groove adapted to communicate with the other set of channels for establishing communication between the other recess and the exhaust channel of the plug, a spring-pressed valve stem formed integral with said head, means connected with the casing for maintaining the valve stem in position, and an operating lever connected to the valve stem, and bearing members mounted in the casing and surrounding the valve stem.

6. A hydraulic valve comprising a valve casing having a bore with the wall thereof shouldered and formed with a plurality of superposed annular recesses, said casing further having lateral ports communicating with said recess, a chamber, and a lateral port communicating with said chamber, a stationary valve plug supported by the shoulders of the wall of the bore, said plug having a vertically disposed set of channels communicating with the lower of said recesses, and a vertically disposed set of channels communicating with the upper of said recesses, said plug furthermore provided with an exhaust channel, a shiftable valve head arranged within said casing, mounted upon said plug and surrounded by said chamber and provided with oppositely disposed ports adapted to communicate with a set of channels for establishing communication between said chamber and one of said recesses, said head furthermore provided on its lower face with a groove adapted to communicate with the other set of channels for establishing communication between the other recess and the exhaust channel of the plug, said plug projecting from said casing, retaining means to prevent movement of the plug, means carried by the plug for maintaining said retaining means in position, a spring pressed valve stem formed integral with said valve head, an operating lever connected to the valve stem, and bearing members mounted in the casing and surrounding the valve stem.

7. A hydraulic valve comprising a casing having a stepped bore with the wall thereof formed with a plurality of superposed annular recesses, said casing further having ports communicating with said recesses, a chamber, and a port communicating with said chamber, a stationary valve plug arranged within the casing and supported by the stepped wall of the bore, said plug having a set of channels communicating with the lower of said recesses, and a set of channels communicating with the upper of said recesses, said plug further provided with an exhaust channel, a shiftable valve head maintained upon said plug and surrounded by said chamber, said valve head provided with ports adapted to communicate with one set of channels for establishing communication between said chamber and one of said recesses, and said head provided on its lower face with a channel adapted to communicate with the other set of channels in the plug for establishing communication between the other recesses and the exhaust channel of the plug.

8. A hydraulic valve comprising a casing having a stepped bore with the wall thereof formed with a plurality of superposed annular recesses, said casing further having ports communicating with said recesses, a chamber, and a port communicating with said chamber, a stationary valve plug arranged within the casing and supported by the stepped wall of the bore, said plug having a set of channels communicating with the lower of said recesses, and a set of channels communicating with the upper of said recesses, said plug further provided with an exhaust channel, a shiftable valve head maintained upon said plug and surrounded by said chamber, said valve head provided with ports adapted to communicate with one set of channels for establishing communication between said chamber and one of said recesses, and said head provided on its lower face with a channel adapted to communicate with the other set of channels in the plug for establishing communication between the other recesses and the exhaust channel of the plug, a spring pressed valve stem secured within the casing and formed integral with the valve head, an operating lever connected to the stem for shifting it, and means for limiting the movement of said lever in either direction.

9. A hydraulic valve comprising a casing having a stepped bore with the wall thereof formed with a plurality of superposed annular recesses, said casing further having ports communicating with said recesses, a chamber, and a port communicating with said chamber, a stationary valve plug arranged within the casing and supported by the stepped wall of the bore, said plug having a set of channels communicating with the lower of said recesses, and a set of channels communicating with the upper of said recesses, said plug further provided with an exhaust channel, a shiftable valve head maintained upon said plug and surrounded by said chamber, said valve head provided with ports adapted to communicate with one set of channels for establishing communication between said chamber and one of said recesses, and said head provided on its lower face with a channel adapted to communicate with the other set of channels in the plug for establishing communication between the other recesses and the exhaust channel of the plug, a spring pressed valve stem secured within the casing and formed integral with the valve head, an operating lever connected to the stem for shifting it, means for limiting the movement of said lever in either direction, and bearing members arranged within the casing and surrounding the valve stem.

In testimony whereof I affix my signature in the presence of two witnesses.

GERHARD BROCKE.

Witnesses:
  MAX H. SROLOVITZ,
  C. V. BROOK.